(12) United States Patent
Booze et al.

(10) Patent No.: US 8,012,577 B2
(45) Date of Patent: Sep. 6, 2011

(54) COMPOSITE ARTICLE MADE BY A PROCESS

(75) Inventors: J. David Booze, Wilmington, DE (US); James E. Weishampel, Amherst, OH (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/820,274

(22) Filed: Jun. 22, 2010

(65) Prior Publication Data

US 2011/0003132 A1    Jan. 6, 2011

Related U.S. Application Data

(60) Provisional application No. 61/222,702, filed on Jul. 2, 2009, provisional application No. 61/222,743, filed on Jul. 2, 2009, provisional application No. 61/222,754, filed on Jul. 2, 2009, provisional application No. 61/222,770, filed on Jul. 2, 2009, provisional application No. 61/222,728, filed on Jul. 2, 2009.

(51) Int. Cl.
*B32B 27/04* (2006.01)

(52) U.S. Cl. .................. 428/300.7; 428/297.1

(58) Field of Classification Search .............. 428/292.1, 428/421, 422, 298.1, 299.1, 299.4, 299.7, 428/297.1, 300.7; 55/488, 486, 489
See application file for complete search history.

(56) References Cited

U.S. PATENT DOCUMENTS

| | | | |
|---|---|---|---|
| 3,159,526 A | 12/1964 | Hartesveldt et al. | |
| 3,298,887 A | 1/1967 | Hartesveldt et al. | |
| 3,458,329 A | 7/1969 | Owens et al. | |
| 3,949,126 A * | 4/1976 | Crawford, Jr. | 428/113 |
| 4,163,172 A * | 7/1979 | Loda | 313/302 |
| 4,163,742 A | 8/1979 | Mansure | |
| 4,335,238 A * | 6/1982 | Moore et al. | 526/254 |
| 4,369,083 A | 1/1983 | Ahmed et al. | |
| 4,420,512 A | 12/1983 | Ogawa et al. | |
| 4,448,910 A | 5/1984 | Haines et al. | |
| 4,448,911 A | 5/1984 | Haines et al. | |
| 4,455,343 A | 6/1984 | Temple | |
| 4,555,446 A | 11/1985 | Sumida et al. | |
| 4,564,377 A * | 1/1986 | Kocatas | 55/488 |
| 4,575,424 A * | 3/1986 | Allington et al. | 210/198.2 |
| 4,975,321 A * | 12/1990 | Gentile et al. | 428/299.4 |
| 5,069,959 A * | 12/1991 | Gentile et al. | 428/298.7 |
| 5,112,209 A | 5/1992 | Ahrweiler et al. | |
| 5,227,385 A | 7/1993 | Galdwell et al. | |
| 5,232,975 A * | 8/1993 | Deakyne | 524/495 |
| 5,236,982 A | 8/1993 | Cossement et al. | |
| 5,253,571 A | 10/1993 | Bielfeldt | |
| 5,323,696 A | 6/1994 | Bielfeldt | |
| 5,333,541 A | 8/1994 | Bielfeldt et al. | |

(Continued)

FOREIGN PATENT DOCUMENTS

EP    1876276 A1    1/2008

(Continued)

OTHER PUBLICATIONS

Salamone, Joseph C., Polymeric Materials Encyclopedia, (Jul. 23, 1996), ISBN-10: 084932470X, ISBN-13: 9780849324703 pp. 8327-8343.

(Continued)

*Primary Examiner* — N. Edwards

(57) ABSTRACT

Disclosed herein is a consolidated or densified composite article comprising polymer, particularly fluoropolymer, and carbon fiber.

6 Claims, 2 Drawing Sheets

U.S. PATENT DOCUMENTS

| | | | |
|---|---|---|---|
| 5,393,822 A | 2/1995 | Marumoto et al. | |
| 5,427,731 A | 6/1995 | Chesna et al. | |
| 5,433,145 A | 7/1995 | Bielfeldt | |
| 5,451,784 A | 9/1995 | Loewenharrdt et al. | |
| 5,454,304 A | 10/1995 | Bielfeldt | |
| 5,460,764 A | 10/1995 | Held | |
| 5,470,409 A | 11/1995 | Deakyne et al. | |
| 5,506,052 A * | 4/1996 | Deakyne et al. | 428/363 |
| 5,520,530 A | 5/1996 | Siempelkamp | |
| 5,546,857 A | 8/1996 | Gerhardt et al. | |
| 5,550,605 A | 8/1996 | Haraguchi et al. | |
| 5,555,799 A | 9/1996 | Amick et al. | |
| 5,559,874 A | 9/1996 | Panosh | |
| 5,589,055 A | 12/1996 | Kobayashi et al. | |
| 5,592,874 A | 1/1997 | Blauhut | |
| 5,750,606 A | 5/1998 | Miura et al. | |
| 5,759,927 A | 6/1998 | Meeker | |
| 5,775,214 A | 7/1998 | Bielfeldt et al. | |
| 5,803,968 A | 9/1998 | Schwartz et al. | |
| 5,824,177 A | 10/1998 | Yoshihara et al. | |
| 5,895,546 A | 4/1999 | Bielfeldt et al. | |
| 5,978,174 A | 11/1999 | Sullivan | |
| 6,032,446 A | 3/2000 | Gola et al. | |
| 6,066,395 A | 5/2000 | Miyoshi et al. | |
| 6,287,410 B1 | 9/2001 | Klemarewski | |
| 6,444,187 B1 | 9/2002 | Miyoshi et al. | |
| 6,520,843 B1 | 2/2003 | Halley | |
| 6,620,471 B1 * | 9/2003 | Do | 428/34.5 |
| 6,855,298 B2 * | 2/2005 | TenEyck | 422/179 |
| 7,011,111 B2 * | 3/2006 | Spiegl et al. | 137/855 |
| 7,094,468 B2 | 8/2006 | Sugiura et al. | |
| 7,135,516 B2 | 11/2006 | Sugiura et al. | |
| 7,150,913 B2 | 12/2006 | Sugiura et al. | |
| 7,357,842 B2 | 4/2008 | Ishikawa et al. | |
| 2007/0082199 A1 | 4/2007 | Schweizer | |
| 2008/0299852 A1 | 12/2008 | Lee et al. | |
| 2009/0033898 A1 | 2/2009 | Yamamoto et al. | |
| 2009/0062426 A1 | 3/2009 | Shiraki et al. | |
| 2011/0001082 A1 | 1/2011 | Booze | |
| 2011/0003132 A1 | 1/2011 | Booze et al. | |
| 2011/0003140 A1 | 1/2011 | Booze et al. | |
| 2011/0003927 A1 | 1/2011 | Booze et al. | |

FOREIGN PATENT DOCUMENTS

| | | |
|---|---|---|
| GB | 1392569 | 4/1975 |
| JP | 2008069474 | 3/2008 |
| WO | 9314150 A1 | 7/1993 |
| WO | 9706204 A1 | 2/1997 |

OTHER PUBLICATIONS

Trende, A., et al. Composites Part A: Applied Science and Manufacturing, "Modelling of heat transfer in the thermoplastic composites manufacturing: double-belt press lamination", vol. 30, Issue 8, Aug. 1999, pp. 935-943.

* cited by examiner

COMPOSITE ARTICLE MADE BY A PROCESS

CROSS-REFERENCE TO RELATED APPLICATIONS

This application claims the benefit of priority to U.S. Provisional Application No. 61/222,728, filed Jul. 2, 2009; U.S. Provisional Application No. 61/222,702, filed Jul. 2, 2009; U.S. Provisional Application No. 61/222,743, filed Jul. 2, 2009; U.S. Provisional Application No. 61/222,754, filed Jul. 2, 2009; and U.S. Provisional Application No. 61,222,770, filed Jul. 2, 2009.

FIELD OF THE INVENTION

The field of the invention encompasses a process for the production of composites containing reinforcing fiber and a polymer, particularly comprising carbon fiber and fluoropolymer.

BACKGROUND OF THE INVENTION

Composite articles comprising or consisting of a polymer (usually a continuous phase, and possibly comprising fluoropolymer(s) and fibers (such as glass fibers, carbon fibers, and graphite fibers) are well known in the art. The addition of fiber to a matrix polymer can improve certain properties of the polymer. These properties can include creep resistance, tensile strength and modulus, and flexural strength and modulus. The reinforcing fiber chosen generally has a higher tensile modulus and strength than the polymer alone. When a fluoropolymer is used as the matrix polymer, as described herein, the resulting composite often has many of the attributes of fluoropolymers such as high temperature resistance and chemical resistance, which make such composites useful as parts, for example, for the chemical processing industry. It is among the objects of this invention to provide a method for the production of such polymer composites that exhibit improved properties and to provide articles made by the method.

Background information regarding producing composites of polymer and fiber or fibers can be found in Polymeric Materials Encyclopedia, by Joseph C. Salamone (Jul. 23, 1996), ISBN-10: 084932470X, ISBN-13: 978-0849324703 pages 8327-8343.

Some background in double-belt press lamination is found in "Modelling of heat transfer in thermoplastic composites manufacturing: double-belt press lamination" by A. Trende, B. T. Astrom, A. Woginger, C. Mayer, M. Neitzel, in Composites Part A: Applied Science and Manufacturing, Volume 30, Issue 8, August 1999, Pages 935-943.

Known related methods and articles include but are not necessarily limited to U.S. Pat. No. 5,470,409 to Deakyne et al., issued Nov. 28, 1995, entitled "Process for making fluoropolymer composites," U.S. Pat. No. 5,232,975 to Deakyne, issued Aug. 3, 1993, entitled "Preconsolidation process for making fluoropolymer composites," U.S. Pat. No. 4,163,742 to Mansure, issued Aug. 7, 1979, entitled "Process and product prepared from tetrafluoroethylene polymer and graphite fibers," U.S. Pat. No. 5,427,731 to Chesna et al., issued Jun. 27, 1995, entitled "Compression molding of structures," and U.S. Pat. No. 7,011,111 to Spiegl et al., issued Mar. 14, 2006, entitled "Sealing elements for compressor valves".

Additional known related methods and articles include but are not necessarily limited to U.S. Pat. No. 5,759,927 to Meeker, issued Jun. 2, 1998, entitled "Glass-fiber-containing non-woven polymer web, and process for preparing same," and U.S. Pat. No. 5,460,764 to Held, issued Oct. 24, 1995, entitled "Method and apparatus for making highly densified sheets".

There remains a need for any one or combinations of improvements in these fields, including but not limited to: a simplified process of manufacture; a robust and/or reproducible process of manufacture that can produce robust and/or reproducible product; a process to produce an article of increased density; an article of increased density; a process to produce products having fewer metal, metallic, ionic, or related impurities, particularly for processes that include a solvent or water; a process for using fibers that preserves fiber length; a process to produce product having a uniform property throughout a useful volume; any process to produce a composite product having a directional property (such as tensile strength, compressive strength, or elongation to break) that is uniform or superior regardless of the direction of measurement (or uniform or superior in one direction, or uniform or superior in two orthogonal directions), and the like.

These improvements are sought in areas where composite articles are used, e.g. equipment for semiconductor manufacture, in aircraft parts, in automotive parts, in gaskets, in seals, and the like.

SUMMARY OF THE INVENTION

Figure 1A:
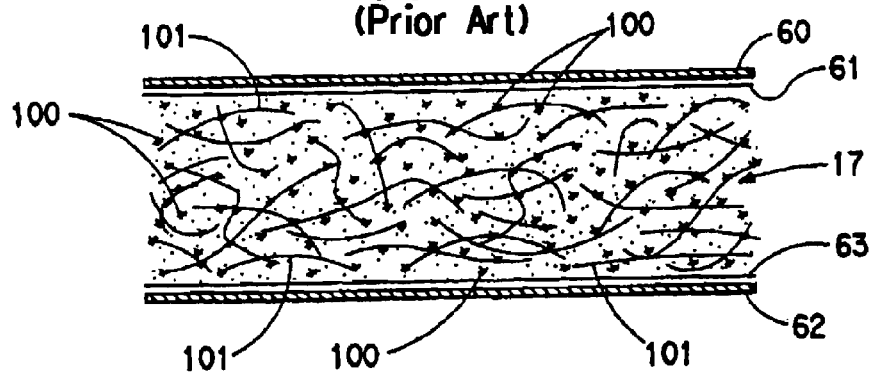
FIG. 1 shows schematically some mattes of the known art.

Disclosed herein is a composite article having a density, Dc, and comprising: (i) polymer having a softening temperature and (ii) fibers, said composite article made by:

providing a matte, comprising: from about 1 wt % to about 90 weight percent of said fibers; and from about 10 weight percent to about 90 weight percent particles of said polymer, said matte having a density, Dm, that is less than Dc;

densifying said matte to a compressed density greater than 1.1 times Dm and less than 0.999 times Dc while at least a portion of said matte is at a temperature less than softening temperature of polymer, to provide a compressed matte;

heating said compressed matte throughout to a temperature greater than said softening temperature at a density greater than 1.1 times Dm and less than 0.999 times Dc, to provide a preconsolidated matte; cooling at least a portion of said preconsolidated matte to a temperature less than said softening temperature, to provide a consolidated matte;

stacking a plurality of said consolidated matte to provide an article;

compressing the height of said article and heating throughout to a temperature greater than said softening temperature, to provide a consolidated composite article; and cooling at least a portion of said consolidated composite article to a temperature less than said softening temperature.

DETAILED DESCRIPTION OF THE INVENTION

Disclosed herein is a method for making a composite article of density Dc comprising polymer and fibers. The method disclosed herein comprises providing a matte comprising: about 1 to about 91 weight percent fiber and about 9 to about 99 weight percent of said polymer. The matte has a density of Dm, and is less than Dc, wherein said polymer has a softening temperature. The matte is densified by compressing the matte to a that is density greater than 1.1 times Dm and less than 0.999 times Dc, while at least a portion of the matte is at a temperature less than said softening temperature, to provide a compressed matte. Thereafter the compressed matte is heated throughout to a temperature greater than said softening temperature while at a consolidated density greater than 1.1 times Dm and less than 0.999 times Dc, to provide a pre-consolidated matte.

At least a portion of the pre-consolidated matter is cooled to a temperature less than said softening temperature, to provide a consolidated matte. The next step is stacking heightwise a plurality of the consolidated matte to provide an unconsolidated article. The unconsolidated article is then consolidated by compressing the height of said unconsolidated article and heating it throughout to a temperature greater than said softening temperature, to provide a consolidated composite article. At least a portion of the consolidated composite article is cooled to a temperature that is less than said softening temperature.

In certain embodiments, the invention can combine elements known to the art in a new manner to achieve one or more unexpected or unpredictable results, including, possibly, unexpected or unpredictable combinations of results. Single elements of such art may include U.S. Pat. No. 5,506,052, 6,066,395, 20090062426, 7,094,468, 7,150,913, 5,589,055, 4,420,512, 4,975,321, 4,555,446, 5,227,2385, 4,448,910, 4,455,343, 20070082199, 6,444,187, 4,448,911, or 5,236,982 or combinations thereof; the disclosure of all of which is incorporated herein by reference.

Density of composite articles can be determined by ASTM D 792-08 Standard Test Methods for Density and Specific Gravity (Relative Density) of Plastics by Displacement. Thickness of mattes can be determined by TAPPI T411 Thickness (Caliper) of Paper, Paperboard and Combined Board, and weight per volume can be determined by cutting an area of known size (e.g. 16 cm by 16 cm) and thickness as determined by TAPPI T411, and weighing that known volume of matte.

Figure 1B:
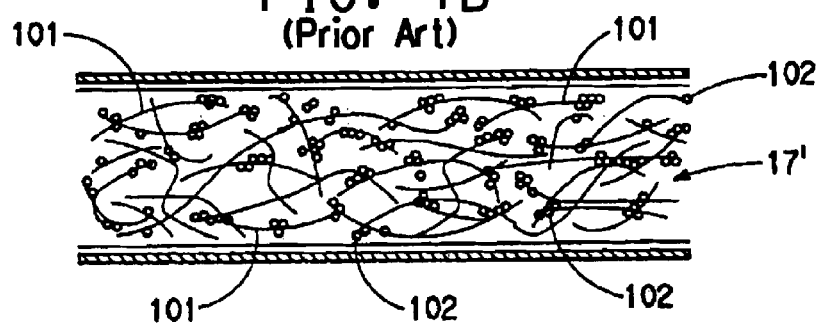
Figure 1C:
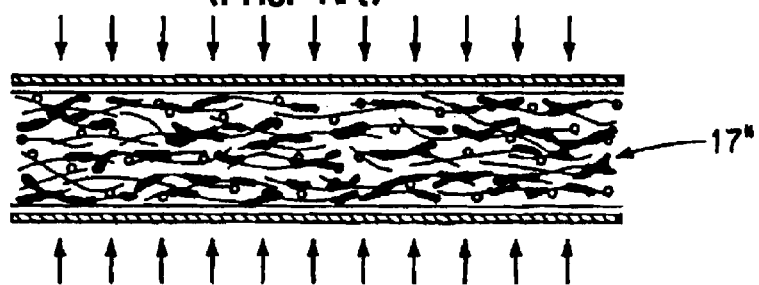

A typical matte of polymer flake or particles and fibers (17 of FIG. 1A or 17' of FIG. 1B) or a composite article may have a density of about 0.2 g/mL or less to about 1.9 g/mL or more, depending somewhat on the weighted density of the polymer and fibers used, A typical consolidate matte of polymer flake, or particles, combined with fibers (17''' of FIG. 1C) should have a density greater than the matte it was made from, and may have a density of about 0.3 g/mL to about 2.9 g/mL, depending somewhat on the weighted density of the polymer and fibers used. FIGS. 1A-D represent the prior art and aid in the understanding the invention. FIG. 1A shows a matte 17 comprising polymer particles 102 and fibers 101 situated between two platens 60,62. Release films 61,63 can optionally be placed between two platens 60, 62 and the matte 17 composed of fibers 101 and polymer particles 102, or the platens can optionally otherwise be treated to prevent sticking of the matte to a platen. The matte 17 can optionally be initially under low contact pressure from the platens as heat is applied to the mattes, for example through the platens. The polymer particles will soften and typically change shape upon exceeding the softening temperature of the polymer. FIG. 1B illustrates a matte that can be obtained as the temperature exceeds the softening temperature and as the formation of beads 102 on (optionally wetting) the fibers within the layer 17'. Not all the original polymer particles need be heated above their softening temperature. Pressure can be applied to platens 60,62 causing the height of the matte to decrease (optionally densifying or compressing it) as illustrated in FIG. 1C for the change in density, for a matte densified throughout at a temperature uniformly higher than the polymer softening temperature to give a consolidated matte 17". The matte as illustrated is in a relatively unconstrained state at the edges of the platens, i.e., in the in-plane directions, therefore the fibers can be moved, along with the polymer, in those directions, giving the fibers an arrangement more perpendicular to the height direction of the matte (the height direction being the z direction) and more parallel to the platen surfaces.

Since the polymer-fiber mix can be unconstrained in-plane during any densification, there need be no compression forces perpendicular to the z axis, and buckling need not occur. The consolidated matte can optionally be cooled under pressure, particularly to below the softening temperature. This same sequence of events can be achieved on a continuous basis using a heated belt press or similarly a heating zone and nip rolls. The process can include the polymer being heated above the softening temperature at some point; this can occur before or after the application of pressure that produces significant densification. The composite can be cooled under pressure.

Belt press pre-consolidation matte or (debulked plies) result in a very flat product versus the incumbent platen press pre-consolidated/debulking ply method. Very flat plies eases the ability to load debulked plies for molding steps.

Significant densification is meant to describe densification to a density less than or equal to a desired density and yet equal to or more than 10% greater than initial density. For example, if initial density of a matte is about 0.586 g/mL and the desired density of a composite article made from a single matte or a stack of such mattes is 2.1 g/mL, then 50% densification for a preconsolidated matte is a density of 0.586+[0.50*(2.1−0.586)]=1.343 g/mL.

Figure 1D:

A consolidated matte 17" of FIG. 1C can be further consolidated as above to form a more densified matte or composite article 17''' of FIG. 1D. The apparatus used for further consolidation may be the same or different than that used for the initial densification.

Figure 2A:
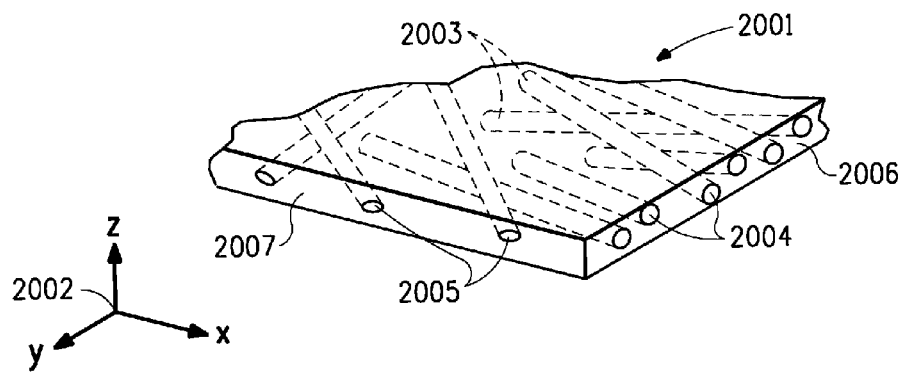
FIG. 2 shows elevation views of a matte and two composite articles according to the present disclosure.

FIG. 2 shows elevation views of an oriented matte and two composite articles comprising such oriented mattes. FIG. 2A shows an oriented matte 2001; for clarity, fibers are shown as imbedded. A coordinate axis set x-y-z 2002 is defined so that the height of the matte is oriented parallel to the z axis. Since fibers 2003 are aligned, on average, along one direction perpendicular to the z axis, one can assign that direction to correspond to the x axis. Perpendicular to z and x axes is the y axis.

The matte illustrated in FIG. 2A has been cut from a larger matte, to make two cut faces (2006 and 2007) parallel to the z axis, and parallel to the y and x axes respectively. By such cutting, an observer can note that fibers 2004 can be cut with relatively circular cross section by the xz face 2006, and fibers 2005 can be cut with relatively elliptical cross section (or ultimately nearly a parallelogram) by the xz face 2006.

Figure 2B:
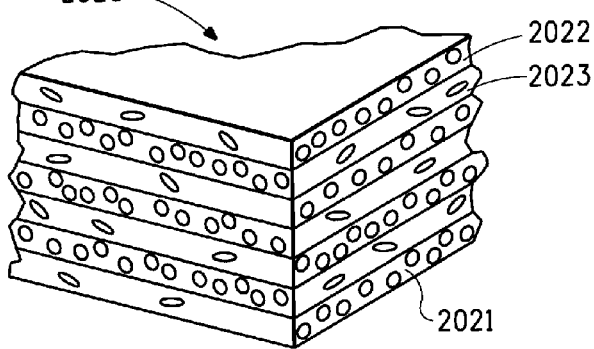

FIG. 2B shows a portion of an oriented composite article that can be made by stacking mattes corresponding to FIG. 2A. The composite article illustrates mattes (e.g. 2022, 2023) can have different orientations, such as an orientation with each z axis parallel (heightwise stacked), and the fiber orientation of each immediately adjacent and contacting matte being at right angles. If a matte is made by consolidating two thin mattes with fiber orientation stacked at right angles, such a matte or analogous mattes can be stacked with each z axis parallel (heightwise stacked), to obtain a composite article of FIG. 2B. Note that if a matte is made by consolidating two mattes with fiber orientation stacked at parallel to give a thicker matte, such a consolidated matte or analogous mattes can not, apparently, be stacked with each z axis parallel (heightwise stacked), to obtain a composite article of FIG. 2B.

Figure 2C:
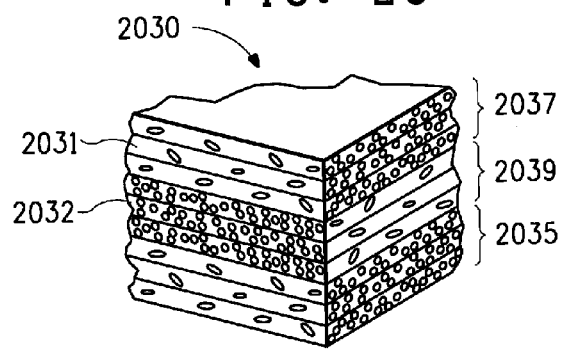

FIG. 2C shows a portion of an oriented composite article 2030 that can be made by stacking mattes corresponding to FIG. 2A (e.g., 2031 and 2032). Note the grouping of pluralities of mattes into groups (2037, 2039, 2035, where the plurality is a triplet of mattes). Some mattes are oriented parallel, some are oriented at right angles. This composite article shows a pattern of stacking that can be termed an orientation pattern of 0, 0, 0, 90, 90, 90 degrees.

A matte can be prepared by any known techniques. For instance, using a paper making process, fibers can be mixed with a polymer to form a mixture or slurry. Any mixing means may be used, but preferably the fibrous components are mixed at about a 0.001% to 5% consistency or solids content (e.g. comprising 0.01-5 parts solids to 99.009-95 parts aqueous solution or water). The slurry may then be diluted with water to enhance formation, and it may finally be flocculated with flocculating agent and drainage retention aid chemicals. Then, the flocculated mixture or slurry may be placed onto a paper making machine to be formed into a wet matte, possibly with orientation of fibers or without orientation of the fibers, possibly oriented in the direction of movement of the matte during the paper making process, or perpendicular to that direction. Alternatively, the matte may be formed by vacuum casting the slurry or other methods. Mattes can be formed by dewatering a slurry, for example using a belt press. A belt press manufacturer is Bright Technologies, Hopkins, Mich. Mattes can be dried, for example in ovens, on rotating drums, or by moving air. For a more detailed description of some standard paper making techniques that can be employed, see U.S. Pat. No. 3,458,329, the disclosure of which is incorporated herein by reference.

Densifying can be carried out by compression or other known methods, which may be upon one or more axes, simultaneously or consecutively. The axes may be mutually orthogonal, such as x, y, and z axes.

Mattes may have any convenient dimensions of length, width, or height. Mattes can be more than 1 cm in height, or less than 0.8, 0.6, 0.4, 0.2, 0.1, 0.05, or 0.01 cm in height.

Densification can be carried out at pressures as low as 100 kPa, and as high as 100 MPa, and at interval pressures between about 100 kPa and about 100 MPa.

Densification, heating, cooling, or combinations of such can be carried out from about 0.1, 1, 2, 5, 10, 20, 100 minutes or many hours, up to about 135 hours, or more.

Any method of densifying can, and may, break at least some of the fibers during processing. Accordingly the length of the fibers can be reduced. It is usually advantageous to maintain a high fiber length, but this goal may be advantageously compromised for certain applications if other properties of the consolidated composite article are improved.

A matte may be made by other means, such as dry air laying optionally with polymer particles present. A matte may be densified by dry needling. Some aspects of matte technology are presented in U.S. Pat. No. 6,855,298, the disclosure of which is incorporated herein by reference.

The polymer of the invention can be a fluoropolymer and any polymer of the invention can comprise repeat units or monomers of tetrafluoroethylene, perfluoro (alkoxyalkane) of 3 to 14 carbon atoms such as perfluoro(vinyl propyl ether), hexafluoropropylene, chlorotrifluoroethylene, ethylene, propylene, or combinations thereof (copolymers).

Any polymer of the invention can optionally flow upon heating, particularly above the polymer melting point or glass transition temperature (Tg). The polymer can optionally wet the fibers, particularly after softening. In a copolymer of any collection of monomers, the content of any comonomer can vary from about 10 to 99 weight percent of the polymer.

Any polymer of the invention can be a thermoplastic, a thermoset, or mixtures or blends thereof. Any polymer of the invention can be cross-linkable or crosslinked. Any composition of the invention can comprise a cross-linker.

Any repeat unit or monomer of the polymer can comprise 0.001 to 99.999 weight percent of the polymer.

The softening temperature of the polymer is a temperature at which the polymer can be slowly but permanently deformed typically without breaking, chipping, or separating. Examples of the softening temperature include the melting point, the lowest temperature of a melting range, the highest temperature of a melting range, or the glass transition temperature.

Particles are small pieces or parts, or tiny portions or flecks. Particles can be free-flowing or stuck to fibers. Types of particles include flakes, grains, shreds, fragments, crumbs, chips, pellets, specks, shavings, etc.

Fibers include, but are not limited to, those composed of: glass; graphite; carbon; fluorinated graphite; aramid such as poly(p-phenyleneterephthtalamide); boron nitride; silicon carbide; polyester; and polyamide. Carbon, graphite and fluorinated graphite fibers are preferred fibers. Fibers of the present disclosure can also be chopped.

The median length of the fibers can be longer or shorter or the same as the median height of the matte containing the fibers.

Fibers may be sized as known in the art. Sizing may comprise, for example, epoxy resins or polymers, urethane-modified epoxy resins or polymers, polyester resins or polymers, phenol resins or polymers, polyamide resins or polymers, polyurethane resins or polymers, polycarbonate resins or polymers, polyetherimide resins or polymers, polyamideimide resins or polymers, polystylylpyridine resins or polymers, polyimide resin, bismaleimide resins or polymers, polysulfone resins or polymers, polyethersulfone resins or polymers, epoxy-modified urethane resins or polymers, polyvinyl alcohol resins or polymers, polyvinyl pyrrolidone resins or polymers, resins or polymers and mixtures thereof. Sizings may be solvent compatible or water compatible, and may be solvent soluble or water soluble. Polyvinylpyrrolidone (PVP), a known sizing agent, is a water-soluble polymer made from the monomer N-vinylpyrrolidone. Known sizing agents are disclosed in US Pub. 20080299852; U.S. Pat. Nos. 5,393,822 and 7,135,516.

One process for the production of a polymer-fiber composite comprises co-dispersing-thin polymer flakes having some irregular fibular structure extending from an irregular periphery. The flakes, or the co-dispersed flakes and fiber in water, used to make a matte by paper-making techniques, can have a Canadian Standard Freeness of greater than 200 up to the Freeness test maximum of 2000. The flakes, or the co-dispersed flakes and fiber in water, used to make a matte by paper-making techniques, can have settling times of from 1 to 13 000 seconds or more. Settling time is measured, optionally with the fiber content ratio by weight to be used in a matte, in an aqueous solution (i.e., less than 1% based on weight of polymer solids suitable to form an apparently homogeneous slurry appropriate for feeding to a screen to ultimately form a matte, observed until such time a new layer is formed on the bottom or the top discernable to the naked eye). Settling time can be greater than from about to 2 to about 12 000 seconds.

In any embodiment, removing most water from matte to form a wet matte; removing more water from the layer to form a dry matte; drying the layer to form a self-supporting planar matte; optionally thermally tacking the web to improve dry strength for handling and preconsolidating said matte by heating said matte above the polymer melt temperature to form a different matte, then applying sufficient pressure normal to the plane of said matte to cause the polymer to flow to form a preconsolidated matte; and cooling that matte. The aqueous slurry can be substantially free of other constituents.

The fiber content in the composite of the present invention is from about 1 to 90 weight percent fiber.

Suitable belt presses are well known, for example in U.S. Pat. Nos. 3,159,526; 3,298,887; 4,369,083; 5,112,209; 5,433,145; 5,454,304; 5,460,764; 5,520,530; 5,546,857; 5,555,799; 5,592,874; 5,759,927; 5,895,546 each of which is hereby incorporated by reference in their entirety. A manufacturer of suitable belt presses, particularly isobaric double belt presses, is Held Technologie GmbH, Germany. A manufacturer of double belt systems useful for fiber reinforced thermoplastics is Berndorf Band GmbH of Austria.

Suitable platen presses are well known, for example U.S. Pat. Nos. 5,775,214, 5,253,571, 5,323,696 and 5,333,541 each of which is hereby incorporated by reference in their entirety. Manufacturers of suitable presses include Maschinenfabrik Herbert Meyer GmbH in Germany (vertical presses or laminating presses, e.g. models APV, Fusing Press AHV-Bm, or AHV-S with up to 20 tons pressure and heating plates up to 673 K).

Suitable methods of applying alternating stages of compression and heating are known, for example U.S. Pat. No. 6,287,410 each of which is hereby incorporated by reference in their entirety.

Suitable methods of applying heat include but are not limited to contacting a matte or composite article with a hot surface (e.g. conduction); using a hot gas jet (e.g. convection); and using radiation (e.g. infrared or microwave radiation).

Densification methods are well known, for example in U.S. Pat. No. 6,032,446 each of which is hereby incorporated by reference in their entirety.

Consolidation can be carried out under the same conditions as densification. In addition, heating to a temperature above the softening temperature or heating to a temperature below the softening temperature, or both in various combinations as known in the art, can be carried out optionally as defined herein, during consolidation. Accordingly, one can make a composite article of density Dc comprising polymer and fibers, said method comprising by providing a first matte. The first matte may be a matter comprised of thin mattes. In either case the matte comprises 1 to 91 weight percent fiber" and "9 to 99 weight percent polymer. The first matte having a density of Dm is less than Dc.

The first matte is densified by compressing to a density greater than 1.1 times Dm and less than 0.999 times Dc while at least a portion of the first matte is at a temperature less than said softening temperature. This will provide a compressed matte. Thereafter, the compressed matte is heated throughout to a temperature greater than the softening temperature of the polymer, while at a consolidated density greater than 1.1 times Dm and less than 0.999 times Dc. This will provide a preconsolidated matte, which is then cooled, or a least a portion is cooled to a temperature less than said softening temperature of the polymer to provide a consolidated matte.

A plurality of consolidated matte is then stacked heightwise to provide an unconsolidated article. The height of the unconsolidated article is compressed and heated throughout to a temperature greater than the polymer softening temperature, to provide a consolidated composite article. At least a portion of the consolidated composite article is cooled to a temperature less than the softening temperature of the polymer.

Disclosed herein is a method for making an composite article with orientation, by preconsolidating said stack by: heating said stack to above the melt temperature of the polymer, then applying sufficient pressure normal to the plane of the matte while the matte is unconstrained in the in-plane direction to cause the fluoropolymer to flow orienting the fibers in substantially the plane of the layer by means of said flow to form a preconsolidated sheet;

Composite articles can be used for chucks, for example spin chucks used in coater chambers to hold wafers, or for CMP chucks for holding wafers or polishing pads during chemical mechanical polishing (CMP). Particularly preferred are chucks which are rotated about their z axis at high rates of speed, where strength in the x-y plane of the composite allows higher diameters or higher rates of speed to be used, allowing for larger chucks or larger wafers or faster processing or more robust processing. Also preferred in chucks are composites that resist deformation, thereby holding the wafer in a planar position for precision processing. Cleanliness (e.g. low metal content, low or slow elution of metal or ions) in composites is also prized in semiconductor manufacturing articles, including in spin, rinse, and dry modules and chucks. Composites are valued as a support structure for the semiconductor wafer, e.g., such support structures also known as wafer chucks, susceptors, or wafer pedestals. Semiconductor manufacturing articles are well known, for example in U.S. Pat. No. 7,357,842; 20090033898; 5,451,784; 5,824,177; 5,803,968; and 6,520,843 each of which is hereby incorporated by reference in their entirety.

Composite articles are useful in sealing elements, for example in compressor valves as disclosed in U.S. Pat. No. 7,011,111; each of which is hereby incorporated by reference in their entirety.

The present invention is useful in at least one, or a combination, of (including but not limited to): a simplified process of manufacture; a robust and/or reproducible process of manufacture that can produce robust and/or reproducible product; a process to produce an article of increased density; an article of increased density; a process to produce products having fewer metal, metallic, ionic, or related impurities, particularly for processes that include a solvent or water; a process for using fibers that preserves fiber length; a process to produce product having a uniform property throughout a useful volume; any process to produce a composite product having a directional property (such as tensile strength, compressive strength, or elongation to break) that is uniform or superior regardless of the direction of measurement (or uniform or superior in one direction, or uniform or superior in two orthogonal directions), and the like.

A composite article of the invention can used for known applications, e.g. equipment for semiconductor manufacture, in aircraft parts, in automotive parts, in gaskets, in seals, and the like. The article of the present invention may be a spin disk.

EXAMPLES

Materials similar to the following, and methods for making similar materials and articles, are detailed in U.S. Pat. No. 5,470,409 to Deakyne et al., issued Nov. 28, 1995, entitled "Process for making fluoropolymer composites," U.S. Pat. No. 5,232,975 to Deakyne, issued Aug. 3, 1993, entitled "Preconsolidation process for making fluoropolymer composites," U.S. Pat. No. 5,427,731 to Chesna et al., issued Jun.

27, 1995, entitled "Compression molding of structures," and U.S. Pat. No. 4,163,742 to Mansure, issued Aug. 7, 1979, entitled "Process and product prepared from tetrafluoroethylene polymer and graphite fibers," all of which are incorporated by reference in their entirety.

In the following Examples, Teflon® PFA is a registered trademark of and available from E.I. du Pont de Nemours and Company, Wilmington, Del., and can include a polymer containing about 99 mole percent tetrafluoroethylene and about 1 mole percent perfluoro(propyl vinyl ether).

A carbon fiber CF1 used was polyacrylonitrile based, had a length of about 6.0 mm, a diameter of about 5 to 7 microns, a bulk density of approximately 200 g/L, approximately 4 weight percent water compatible sizing, a carbon density of approximately 1.8 g/cm3 by ASTM D1505, a tensile strength of at least about 500 ksi (greater than 3450 MPa) and tensile modulus of at least approximately 31.6 Msi by ASTM D4018. Elemental analysis of the fiber for metal content in units of nanomoles per gram fiber showed results of approximately 170 000 for sodium, 770 for potassium, 180 for calcium, and 22 for aluminum.

A similar fiber CF2 had lower content of metals. Elemental analysis of the fiber for metal content in units of nanomoles per gram fiber showed results of approximately 830 for sodium, 510 for potassium, less than 10 for calcium, and 3 for aluminum. Tensile strength was >500 ksi (>3.45 GPa), tensile modulus was >30 Msi (>207 GPa), and the fiber appeared to be somewhat stronger than CF1. The sizing level was 3.8 weight percent; the sizing was characterized as water soluble.

A fiber CF3 similar to CF2 in physical properties, also had content of metals similar to CF2, yet was essentially free of sizing.

A type of Teflon® PFA pellets PFAP1 (tetrafluoroethylene-perfluoro(propyl vinyl ether) copolymer, CAS 26655-00-5) have a melting point of approximately 305 C, a flow rate of 14 g/(10 min) and tensile yield strength of approximately 13.8 MPa and tensile strength of approximately 25 MPa at 25 C and 12 MPa at 250 C by ASTM D3307, and a specific gravity of approximately 2.15 g/mL.

PFA flakes (PFAF1) from PFAP1 were made using a disc mill of the type manufactured by Andritz Sprout (Muncy, Pa.) as taught in Patent/Publication Number U.S. Pat. No. 5,506,052A by Deakyne.

A wet matte Mw1 was made from 20% by weight CF1 and 80% by weight PFAF1 according to the methods of U.S. Pat. No. 5,506,052A.

The dry matte Md1 made from Mw1 (before notable compression of Mw1) has a width of approximately 16.75 inches, a length of over 18 inches, and a basis weight of approximately 0.12 lb/ft2.

The coherent matte Mcg made from Md1 (before notable compression of Md1) has a thickness of approximately 0.095 inches (approximately 2.4 mm, 2400 microns) and approximately the same basis weight.

A preconsolidated article CAp1-24 was made on a platen press from cut portions of coherent matte type Mc1. Squares of approximately 16.5 inches were cut, making note of the original length direction. Approximately 24 squares were stacked one upon the other with the length directions each orthogonally oriented to their one (for top or bottom matte) or two (for internal matte) nearest neighbors to produce a stack about 2.2 inches thick. The stack at essentially ambient temperature was placed in a temperature-controlled platen press and heated so that the temperature throughout the stack was greater than 310 C (583 K, 590 F) while the stack was minimally compressed along the thickness (z) direction at a pressure less than 90 psi (4310 Pa), while being unconstrained by any added pressure in the length and width (x and y) directions. The completely heated stack was then further compressed along the thickness direction while heating was ended and cooling was begun. The stack was thus consolidated to a thickness of about 0.285 inches and the temperature was decreased throughout the article to less than 290 C (563 K, 554 F). Then the temperature of and pressure on the stack were reduced to ambient conditions to obtain the article CA1-24.

Articles CA2-24 and CA3-24 were made as for CA1-24 by substitution of carbon fibers CF2 and CF3 respectively for CF1. The wet matte Mw3 incorporating CF3 (free of sizing) was notably different in processing and appearance compared to Mw1 and Mw2 incorporating CF2. The composite material made from the sized carbon fibers CF2 demonstrated superior tensile strength and appearance.

A heatable belt press HBP1 or HPB2 was used to make preconsolidated mattes. HBP1 was a continuous dual belt press with a working width of about 30 inches and a working length of about 10 feet. The constant gap working height was adjustable. The belt press temperature was adjustable in multiple zones.

In run BP1, the entrance zones of HBP1 were set to 500 F, the internal transport zones were set to 700 F, and the later cooling zones within the working length were cooled by water entering the zones at approximately 32 F and exiting the final cooling zone at less than 100 F. The gap between the two belts was set to about 0.028 inches as measured the thickness after exit by a length of solder passed through the press. Both belts were coated by a release formulation. A single sheet of matte about 0.095 inches in height was passed through the press to continuously produce a preconsolidated matte about 0.015 inches in height. The matte was fed into the belt press at 12 inches per minute. In trial BP2, the feed rate of matte was increased to 15 inches per minute.

In trial BP3, three mattes were continuously and simultaneously fed into the belt press while aligned with their lengths parallel. The gap between the two belts was approximately 0.084 inches, and the preconsolidated matte height was approximately 0.045 inches. Feed rate was 12 inches per minute. Analogously in BP4, five mattes were continuously and simultaneously fed into the belt press while aligned with their lengths parallel. The gap between the two belts was approximately 0.10 inches, and the preconsolidated matte height was approximately 0.075 inches. Feed rate was 12 inches per minute.

The preconsolidated mattes from each belt press process (BP1-4, etc.) were separately cut into portions, assembled mutually orthogonally into stacks as for the platen-press-made material, and finally compressed as follows.

A final compression of stacks of preconsolidated mattes were made to achieve final products about 6.5 inches in height.

Preconsolidated matte made on the platen press at a density of 1.85 g/mL has been noted to expand so as to lower its density to about 1.4 g/mL during heating to above 300 C while restrained by [80 tons on 16 sq inch]. Preconsolidated matte made on the constant gap belt press had a density of about 1.4 g/mL and did not undergo noticeable expansion during heating to 300 C while restrained by the same pressure. Final densification was higher in the case of reconsolidated matte made on the constant gap belt press under identical conditions of exposed pressure and temperature profiles in the article press.

A composite article can a coefficient of thermal expansion in the XY direction of about 10 ppm/K; the coefficient of thermal expansion in the Z direction can be greater or less than in the XY direction.

All parts are by mass unless otherwise noted.

What is claimed is:

1. A consolidated composite article having a density, Dc, and comprising: (i) a polymer having a softening temperature and (ii) fibers, said composite article produced by:
   providing a matte, wherein said matte is a mixture comprising: from about 1 wt % to about 90 weight percent of said fibers; and from about 10 weight percent to about 90 weight percent particles of a polymer, said matte having a density, Dm, that is less than Dc;
   densifying said matte to a compressed density greater than 1.1 times Dm and less than 0.999 times Dc while at least a portion of said matte is at a temperature less than softening temperature of polymer, to provide a compressed matte;
   heating said compressed matte throughout to a temperature greater than said softening temperature at a density greater than 1.1 times Dm and less than 0.999 times Dc, to provide a preconsolidated matte;
   cooling at least a portion of said preconsolidated matte to a temperature less than said softening temperature, to provide a consolidated matte;
   stacking a plurality of said consolidated matte to provide an article having fiber orientation of each immediately adjacent and contacting matte at right angles;
   compressing the height of said article and heating throughout to a temperature greater than said softening temperature, to provide a consolidated composite article; and
   cooling at least a portion of said consolidated composite article to a temperature less than said softening temperature.

2. The composite article of claim 1 wherein said polymer is selected from fluoropolymer or polymers comprising repeat units or monomers of tetrafluoroethylene, perfluoro (alkoxyalkane) of 3 to 14 carbon atoms.

3. The composite article of claim 2 wherein said polymer is selected from the group consisting of perfluoro(vinyl propyl ether), hexafluoropropylene, chlorotrifluoroethylene, ethylene, propylene, and combinations thereof.

4. The composite article of claim 1 wherein said polymer comprises (tetrafluoroethylene-perfluoro(propyl vinyl ether) copolymer.

5. The composite article of claim 1 wherein said fibers are selected from the group consisting of glass, graphite, carbon; fluorinated graphite; aramid, boron nitride; silicon carbide; polyester; and polyamide.

6. The composite article of claim 1 or 4 wherein said fibers are chopped fibers.

* * * * *